July 8, 1958  R. G. SMITH  2,842,283
CLOSURE FOR PRESSURE VESSELS
Filed Feb. 20, 1956  3 Sheets-Sheet 1
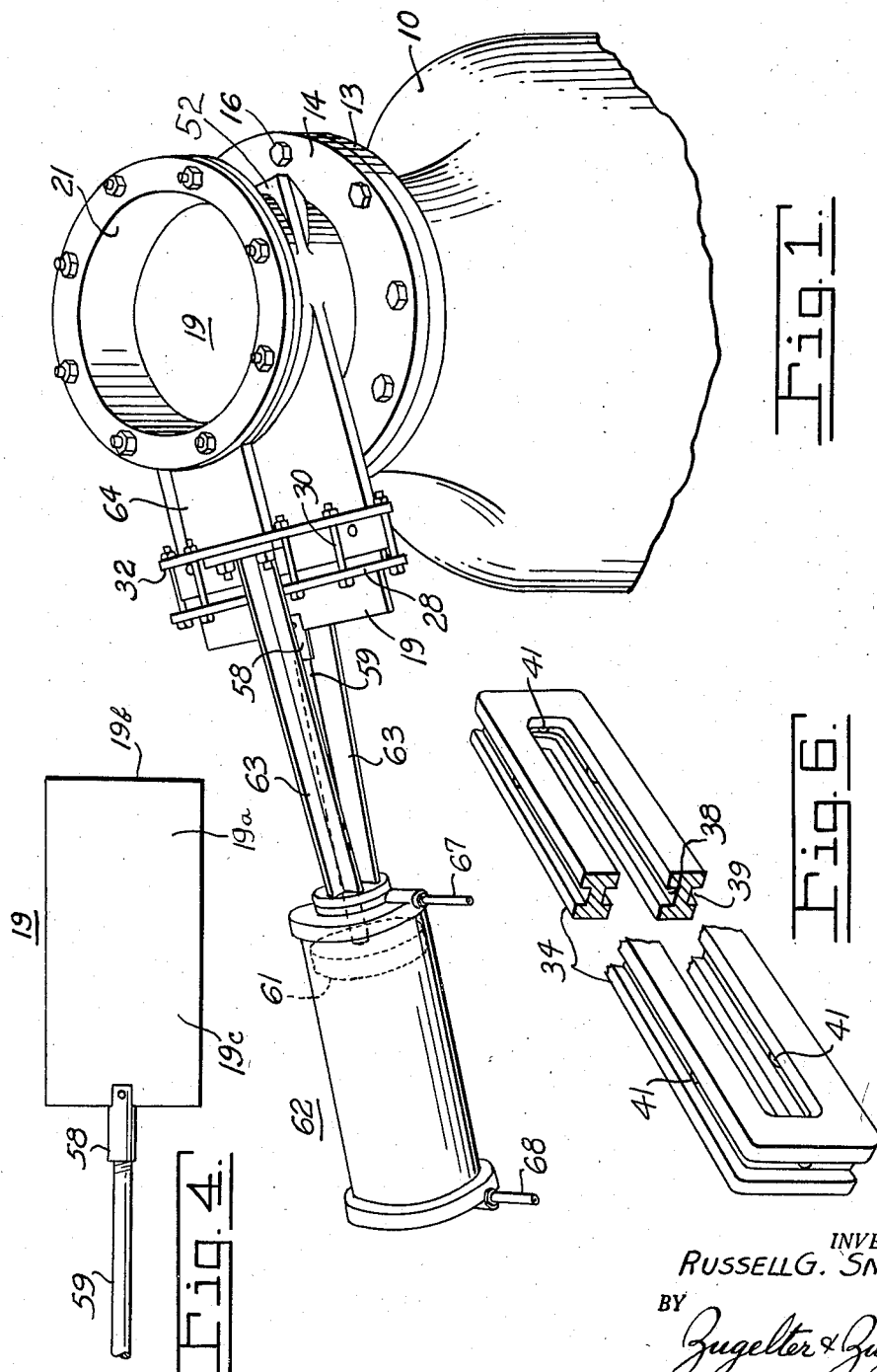
INVENTOR.
RUSSELL G. SMITH
BY
Zugelter & Zugelter
Attys.

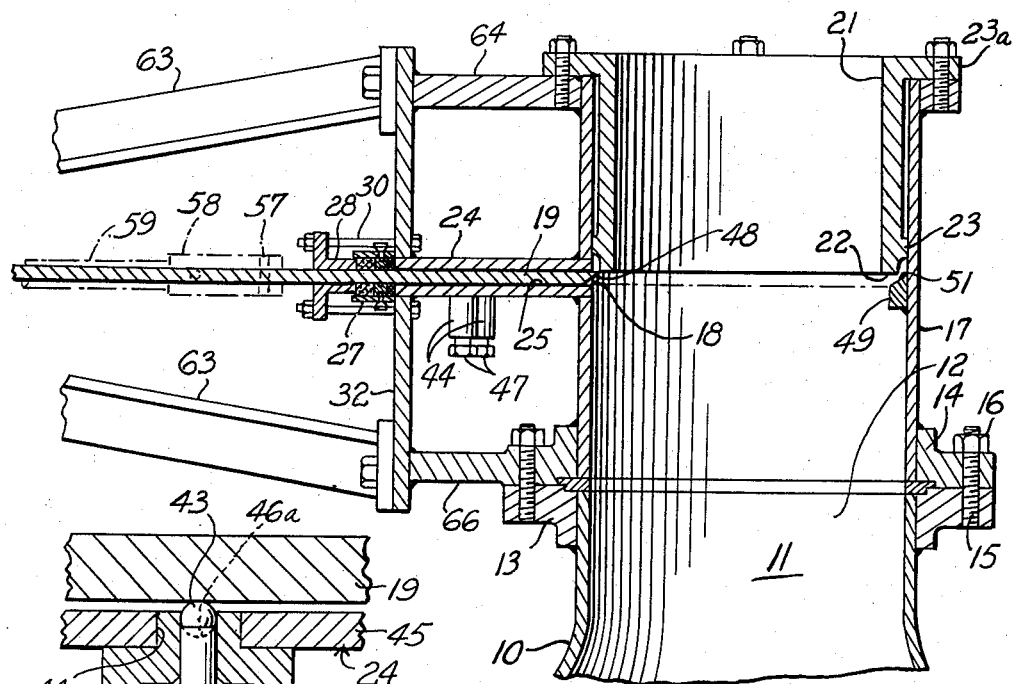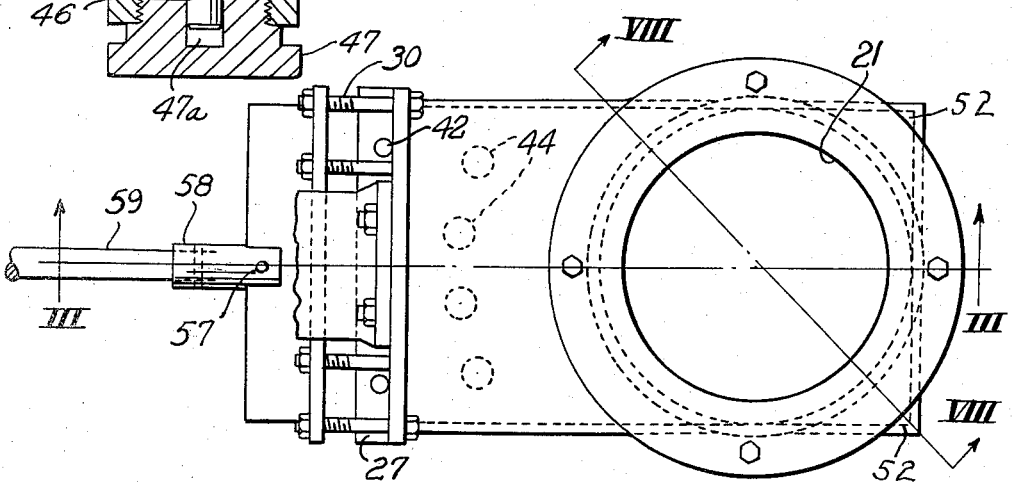

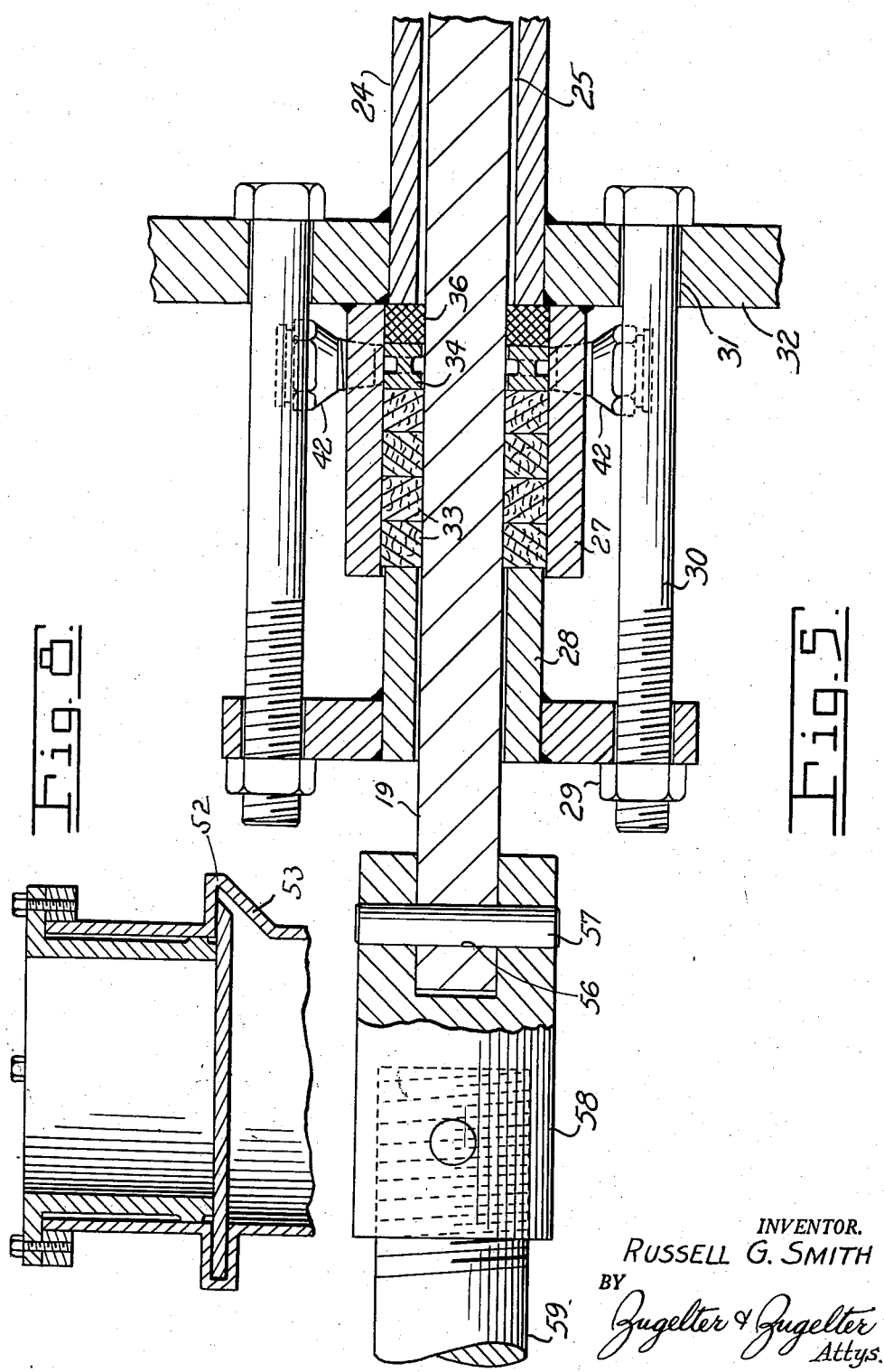

ated July 8, 1958

United States Patent Office

2,842,283
CLOSURE FOR PRESSURE VESSELS

Russell G. Smith, Cincinnati, Ohio, assignor to The Wm. Powell Company, Cincinnati, Ohio, a corporation of Ohio Application February 20, 1956, Serial No. 566,403

6 Claims. (Cl. 220—41)

This invention relates to pressure vessels. More particularly, this invention relates to a closure for a pressure vessel.

Pressure vessels such as those used for digesting wood chips in the manufacture of wood pulp, or for other chemical processes, must be opened during charging of the vessel and must be closed tightly during operation, so that the pressure is retained therein. Furthermore, during charging, wood chips, and materials associated therewith passing through the opening have a tendency to lodge at the opening and interfere with proper sealing thereof.

An object of this invention is to provide a self-cleaning closure device for such a pressure vessel in which pressure inside the vessel serves to effect sealing when the vessel is closed by forcing a closure plate or disc which spans the opening against a sealing bushing or collar.

A further object of this invention is to provide a flat closure plate for closing such a pressure vessel in which pressure inside the pressure vessel urges the plate to sealed position and in which a film of grease on the plate forms a seal between the plate and the sealing bushing.

A further object of this invention is to provide a device for coating the closure plate with grease when the closure is opened and closed.

A further object of this invention is to provide a grease spreading arrangement for such a closure plate which spreads grease on the shank of the closure plate when the shank moves through a packing box and in which the grease is further spread from the shank onto the face of the closure plate as the plate is opened and closed.

A further object of this invention is to provide a packing box for such a device having an elongated slot in which the shank of the plate is reciprocated, a lantern ring inside the packing box embracing the shank of the plate, the lantern ring having grease distributing and sealing grooves on its inner and outer faces, packing outboard of the lantern ring, and a braided or woven metal scraper ring inboard of the lantern ring, the scraper ring distributing the grease and scraping excess grease from the closure plate, grease in the grooves of the lantern ring forming a seal between the plate, the lantern ring and the packing box.

The above and other objects and features will in part be apparent, and will in part be obvious to those having ordinary skill in the art to which this invention pertains, from the following detailed description and the drawings.

In the drawings:

Fig. 1 is a perspective view of a closure for a pressure vessel constructed in accordance with an embodiment of this invention, the closure being shown in conjunction with a fragmentary upper portion of the pressure vessel;

Fig. 2 is a plan view of the closure illustrated in Fig. 1;

Fig. 3 is a view in section taken on the line III—III in Fig. 2;

Fig. 4 is a plan view of a closure plate which forms a part of the closure and of a portion of a rod which operates the closure plate;

Fig. 5 is an enlarged view in section of a packing box and a grease distributing fitting which forms a part of the closure;

Fig. 6 is an enlarged perspective view of a lantern ring which forms a portion of the grease distributing fitting of the closure;

Fig. 7 is an enlarged view in section showing details of a spring pressed ball arrangement which forms a part of the device; and Fig. 8 is a view in section taken on the line VIII—VIII in Fig. 2.

In the following detailed description and the drawings like reference characters indicate like parts.

In Figs. 1 and 3 is shown a pressure vessel 10, which may be of the type used in digesting wood chips in the manufacture of wood pulp, or the like. The pressure vessel 10 is provided with a neck 11 having an opening 12 (Fig. 3) at the upper end thereof. A flange member 13 is mounted on the neck 11. To flange member 13 is attached a flange member 14 by means of studs 15 and nuts 16. The flange member 14 is welded to a tubular body 17 which is aligned with the opening 12.

The body 17 is provided on one side with a relatively thin substantially half-circular opening or slot 18 through which a closure plate or disk 19 reciprocates from open to closed position as shown in Fig. 3. As shown in Fig. 4, the closure plate includes a sealing portion 19a having an edge 19b and a shank 19c. The width of the closure plate is approximately equal to the diameter of the body 17. The closure plate 19 reciprocates between an open position shown in full lines and a closed position shown in dot-dash lines in Fig. 3.

A flanged bushing or collar 21 is mounted in the body, and, as shown, the lower end thereof is a flat face 22 flush with the upper edge of slot 18. When plate 19 is in closed position, it is urged by pressure in the pressure vessel against the inner end of bushing 21 to form a seal.

The bushing is removably mounted inside the body so that the lower end can be resurfaced as and when needed. As shown in Fig. 3, the bushing is provided with a circumferential rib 23 which engages the inner wall of the body to properly center it. A flange 23a on the bushing overlies the upper end of the body and is bolted thereto.

The closure plate reciprocates in a housing 24 having a slot 25 therethrough in communication with the slot 18 in the body 17. A packing box 27 is mounted at the outer end of the housing 24. In the packing box is mounted a packing gland 28 (see Fig. 5) which may be drawn toward the housing 24 by means of nuts 29 mounted on bolts 30. The bolts extend through openings 31 in a plate 32. The plate 32, in turn, is welded to the housing 24 and to the packing box 27 and holds the housing and packing box in assembled relation.

Inside the packing box 27 are mounted packing rings 33, a grease distributing or lantern ring 34, and a grease scraping ring 36. The lantern ring is formed of metal such as steel, or the like, and, as shown in Fig. 6, is provided with an interior groove 38, an exterior groove 39, and openings or bores 41 which give communication between the grooves. Grease under pressure is injected through the wall of the packing box into the outer groove 39 by means of grease fittings 42. Two grease fittings are shown, but additional grease fittings may be added, if desired. The grease is distributed through the grooves of the lantern ring to coat the faces of the closure plate as the closure plate reciprocates in the packing box. In addition, the grease in the inner and outer grooves of the lantern ring forms grease seals with the closure plate 19 and the packing box 27, respectively. The grease scraping ring 36 is formed of woven or braided metal strands, which may be formed of copper or other suitable metal. The ring 36 serves to scrape excess grease from the closure plate and retain the grease in the grooves of the lantern ring. The packing rings 33 form a seal around the shank of the closure plate and prevent excessive loss of grease along the shank of the closure plate.

As indicated in Fig. 7, spring pressed balls 43 (only one of which is shown) are urged against the under side of the closure plate to hold the plate raised in such a position that the closure plate is in engagement or nearly in engagement with the bushing 21 at all times. Each of the balls 43 is mounted in a sleeve 44. Sleeve 44 is attached to and communicates with an opening 44a in a plate 45 which forms the lower portion of housing 24. A compression spring 45a inside sleeve 44 urges the ball 43 upwardly against the closure plate (see Fig. 7). The spring engages a collar 45b on a push rod 46. The upper end of the rod is concave as indicated at 46a to form a socket for the ball. The lower end of the spring is engaged by a cap 47. The cap 47 is threaded to the sleeve and can be adjusted to control the force exerted by the spring. A bore 47a in the cap receives and guides the lower end of the rod 46.

The spring pressed balls urge the closure plate upwardly toward the collar 21 (Fig. 3). As the closure plate reciprocates, grease is picked up by the shank of the closure plate as it passes through the packing box, and the grease is distributed over the upper face of the closure plate as it reciprocates past the edge of the collar.

As shown in Fig. 3, the inner edge of the closure plate is beveled as indicated at 48. A series of wedge plugs 49 having beveled surfaces 51, are welded to the inside of the body and can be engaged by the free edge of the closure plate to urge the edge of the plate upwardly toward the collar. As shown in Fig. 4, the closure plate 19 is rectangular in shape. The body 17 is provided with a pair of hollow generally pyramid-shaped portions 52 (Figs. 1, 2, and 3) into which corners of the closure plate extend when the plate is closed (see Fig. 8). As shown most clearly in Fig. 8, the lower walls 53 of the portions 52 slope downwardly and inwardly so that, if any chips or the like are carried by the edge of the closure plate into these portions, they are discharged downwardly into the pressure vessel. When the closure plate is closed and pressure builds up inside the pressure vessel, the pressure urges the closure plate firmly toward the collar, and the grease on the closure plate, engaging the collar, forms a seal between the closure plate and the collar.

The outer edge of the closure plate is provided with an opening 56 (see Fig. 5) through which a pin 57 passes. The pin 57, in turn, is carried by a clevis 58 at one end of a rod 59. The rod 59, in turn, is connected to a piston 61 of an air cylinder 62 (see Fig. 1), mounted on yoke arms 63. The yoke arms are attached to the plate 32, and, as shown in Fig. 3, the plate 32 is connected to the collar 21 and to the flange member 14 by members 64 and 66, respectively, to make a rigid structure for supporting the air cylinder and the packing box. Air injected into the air cylinder through ports 67 and 68, respectively (Fig. 1), causes the piston 61 to draw the closure plate to open or closed positions, as desired.

The grease scraping ring 36 may be formed of braided copper strands, or the like, and is constructed to closely embrace the closure plate so that the grease scraping ring 36 scrapes excess grease from the closure plate and retains the grease in the grooves of the lantern ring.

The structure illustrated in the drawings and described above is subject to structural modification without departing from the spirit and scope of the invention as defined in the appended claims.

Having described my invention, what I claim as new and desire to secure by Letters Patent is:

1. In a closure for a pressure vessel having an opening therein, a tubular body communicating with the opening, there being a slot in one side of the body, a closure plate reciprocable in said slot between open and closed positions, in the latter of which the closure plate spans the opening, and a collar in the body engageable by the closure plate when closed, a packing and sealing arrangement which comprises a packing box connected to the slot and surrounding the shank of the closure plate, a lantern ring inside the packing box, said lantern ring having an elongated central opening receiving the closure plate in closely embracing relation, said lantern ring having a grease distributing groove facing the closure plate, means for injecting grease under pressure into said groove to coat the closure plate with grease as it reciprocates in the packing box, packing in the packing box outboard of the lantern ring, and a woven metal ring inside the packing box embracing the closure plate inboard of the lantern ring to wipe excess grease from the closure plate and retain the grease in the groove of the lantern ring to maintain pressure in the pressure vessel, the pressure urging the closure plate toward the collar when the closure plate is closed so that the grease on the closure plate seals the opening when the closure plate is in closed position.

2. A closure for a pressure vessel having an opening therein, said closure comprising a tubular body in communication with the opening, there being a slot in one side of the body, a flat closure plate reciprocably mounted in said slot for moving between a closed position spanning the opening and an open position, a housing attached to the side of the body surrounding the slot and extending outwardly therefrom, a packing box in communication with the housing, a lantern ring inside the packing box and embracing the closure plate, said lantern ring having an elongated central opening receiving the closure plate in closely embracing relation, said lantern ring having a continuous grease distributing groove in the interior face thereof facing the closure plate and an outwardly facing continuous groove facing the wall of the packing box, the grooves of the lantern ring being in communication by means of an opening therebetween, means for injecting grease through the wall of the packing box into the outer groove of the lantern ring to be distributed through the opening into the inner groove of the lantern ring, packing in the packing box outboard of the lantern ring, a woven metal ring inside the packing box embracing the closure plate inboard of the lantern ring to wipe excess grease from the closure plate and retain the grease in the grooves of the lantern ring, the grease in the grooves of the lantern ring forming a seal between the packing box, the lantern ring, and the closure plate, and a collar inside the body outboard of the slot, pressure inside the pressure vessel urging the closure plate toward the collar when closed, the grease on the plate forming a seal therebetween.

3. In a closure for a pressure vessel having an opening therein, a tubular body communicating with the opening, there being a slot in one side of the body, a closure plate reciprocable in said slot between open and closed positions, in the latter of which the closure plate spans the opening, and a collar in the body engageable by the closure plate when closed, a packing and sealing arrangement which comprises a packing box connected to the slot and surrounding the closure plate, a lantern ring inside the packing box, said lantern ring having an elongated central opening receiving the closure plate in closely embracing relation, said lantern ring having a grease distributing groove facing the closure plate, means for injecting grease under pressure into said groove to coat the closure plate with grease as it reciprocates in the packing box, packing in the packing box outboard of the lantern ring, and a woven metal ring inside the packing box embracing the closure plate inboard of the lantern ring to wipe excess grease from the closure plate and retain the grease in the groove of the lantern ring, pressure inside the vessel urging the closure plate toward the collar when the closure plate is closed, so that the grease on the closure plate forms a seal between the closure plate and the collar when the closure plate is in closed position.

4. In a closure for a pressure vessel having an opening therein, a tubular body communicating with the opening, there being a slot in one side of the body, a closure plate reciprocable in said slot between open and closed positions, in the latter of which the closure plate spans the opening, and a collar in the body engageable by the closure plate when closed, a packing and sealing arrangement which comprises a packing box connected to the slot and surrounding the closure plate, a lantern ring inside the packing box, said lantern ring having an elongated central opening receiving the closure plate in closely embracing relation, the lantern ring having a pair of elongated sides which are parallel and disposed on opposite sides of the closure plate, said lantern ring having an outwardly facing continuous groove facing the wall of the packing box and an inwardly facing, grease distributing groove facing the closure plate, the grooves of the lantern ring being in communication by means of spaced openings, there being a plurality of said openings in each of said elongated sides of the lantern ring, means for injecting grease through the wall of the packing box into the outer groove of the lantern ring to be distributed through the openings into the inner groove of the lantern ring, the grease in the grooves of the lantern ring forming a seal between the packing box, the lantern ring, and the closure plate, the grease coating the closure plate as it reciprocates in the packing box, packing in the packing box outboard of the lantern ring, and a woven metal ring inside the packing box embracing the closure plate inboard of the lantern ring to wipe excess grease from the closure plate and retain the grease in the grooves of the lantern ring, pressure inside the pressure vessel urging the closure plate toward the collar when the closure plate is closed so that the grease on the closure plate forms a seal between the closure plate and the collar when the closure plate is in closed position.

5. In a closure for a pressure vessel having an opening therein, an upright tubular body communicating with the opening, there being a slot in one side of the body, a horizontal closure plate reciprocable in said slot between open and closed positions, in the latter of which the closure plate spans the opening, and a collar in the body engageable by the closure plate when closed, a packing and sealing arrangement which comprises a packing box connected to the slot and surrounding the closure plate, a lantern ring inside the packing box, said lantern ring having an elongated central opening receiving the closure plate in embracing relation, said lantern ring having a grease distributing groove facing the closure plate, means for injecting grease under pressure into said groove to coat the closure plate with grease as it reciprocates in the slot, packing in the packing box outboard of the lantern ring, a woven metal ring inside the packing box embracing the closure plate inboard of the lantern ring to wipe excess grease from the closure plate and retain the grease in the groove of the lantern ring, and resilient means intermediate the slot and the packing box urging the closure plate upwardly to position the closure plate with grease thereon substantially in engagement with the collar when the closure plate is closed, pressure inside the vessel urging the closure plate toward the collar when the closure plate is closed, so that the grease on the closure plate forms a seal between the closure plate and the collar when the closure plate is in closed position.

6. A closure for a pressure vessel having an opening therein, said closure comprising a tubular body in communication with the opening, there being a slot in one side of the body, a flat closure plate mounted in said slot for moving between a closed position spanning the opening and an open position, a housing attached to the side of the body surrounding the slot and extending outwardly therefrom, a packing box in communication with the housing, a lantern ring inside the packing box and embracing the closure plate, said lantern ring having an elongated central opening receiving the closure plate in closely embracing relation, said lantern ring having a continuous grease distributing groove in the interior face thereof facing the closure plate and an outwardly facing continuous groove facing the wall of the packing box, the grooves of the lantern ring being in communication by means of an opening therebetween, means for injecting grease through the wall of the packing box into the outer groove of the lantern ring, to be distributed through the opening into the inner groove of the lantern ring, packing in the packing box outboard of the lantern ring, a woven metal ring inside the packing box embracing the closure plate inboard of the lantern ring to wipe excess grease from the closure plate and retain the grease in the grooves of the lantern ring, the grease in the grooves of the lantern ring forming a seal between the packing box, the lantern ring, and the closure plate, a collar member removably mounted inside the tubular body, means for releasably attaching the collar member to the body, and a seat on the collar member engageable by the closure plate when closed, the seat being outboard of the slot, pressure inside the pressure vessel urging the closure plate toward the collar when closed, the grease on the plate forming a seal therebetween.

References Cited in the file of this patent

UNITED STATES PATENTS

| | | |
|---|---|---|
| 1,653,631 | Kirkland | Dec. 27, 1927 |
| 1,874,627 | Riley | Aug. 30, 1932 |
| 2,122,560 | De Florez | July 5, 1938 |
| 2,611,576 | Storment | Sept. 23, 1952 |
| 2,720,379 | Williams | Oct. 11, 1955 |